United States Patent
Gha

(10) Patent No.: US 8,582,146 B2
(45) Date of Patent: Nov. 12, 2013

(54) IMAGE FORMING METHOD AND APPARATUS

(75) Inventor: Hwang-hyeon Gha, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1233 days.

(21) Appl. No.: 12/431,139

(22) Filed: Apr. 28, 2009

(65) Prior Publication Data

US 2010/0097637 A1    Apr. 22, 2010

(30) Foreign Application Priority Data

Oct. 21, 2008  (KR) .............................. 2008-103202

(51) Int. Cl.
- G06F 15/00 (2006.01)
- G06F 3/12 (2006.01)
- G06K 1/00 (2006.01)
- G06K 15/00 (2006.01)

(52) U.S. Cl.
USPC ........................... 358/1.15; 358/1.9; 358/1.16

(58) Field of Classification Search
None
See application file for complete search history.

(56) References Cited

U.S. PATENT DOCUMENTS

| | | | |
|---|---|---|---|
| 8,289,550 B2 * | 10/2012 | Shimma ....................... 358/1.15 |
| 2002/0147689 A1 * | 10/2002 | Falkner ........................... 705/52 |
| 2004/0046868 A1 * | 3/2004 | Anderson et al. ......... 348/207.11 |
| 2004/0177159 A1 * | 9/2004 | Butterfield et al. ........... 709/246 |
| 2005/0036034 A1 * | 2/2005 | Rea et al. .................... 348/207.1 |
| 2006/0132616 A1 * | 6/2006 | Tanaka et al. ............... 348/211.3 |
| 2007/0053004 A1 * | 3/2007 | Calaway ...................... 358/3.28 |
| 2008/0281878 A1 * | 11/2008 | Scott et al. .................... 707/204 |
| 2008/0284855 A1 * | 11/2008 | Umeyama et al. ......... 348/207.1 |
| 2010/0035549 A1 * | 2/2010 | Fujii ........................... 455/41.3 |

* cited by examiner

*Primary Examiner* — Ming Hon
(74) *Attorney, Agent, or Firm* — Staas & Halsey LLP

(57) ABSTRACT

An image forming method and apparatus, wherein the image forming apparatus is wirelessly connectable to one or more mobile devices and the image forming method comprises connecting the image forming apparatus to the one or more mobile devices, determining whether the image forming apparatus has been previously connected to the one or more mobile devices, obtaining a first photo list stored in the one or more mobile device, if determined that the image forming apparatus has been previously connected to the one or more mobile devices, comparing the obtained first photo list with a second photo list stored in the image forming apparatus, updating the second photo list in consideration of the obtained first photo list if determined that the obtained first photo list is different from the second photo list, and displaying the updated second photo list. Thus, the image forming apparatus performing a plurality of printing operations can complete the plurality of printing operations very rapidly.

23 Claims, 2 Drawing Sheets

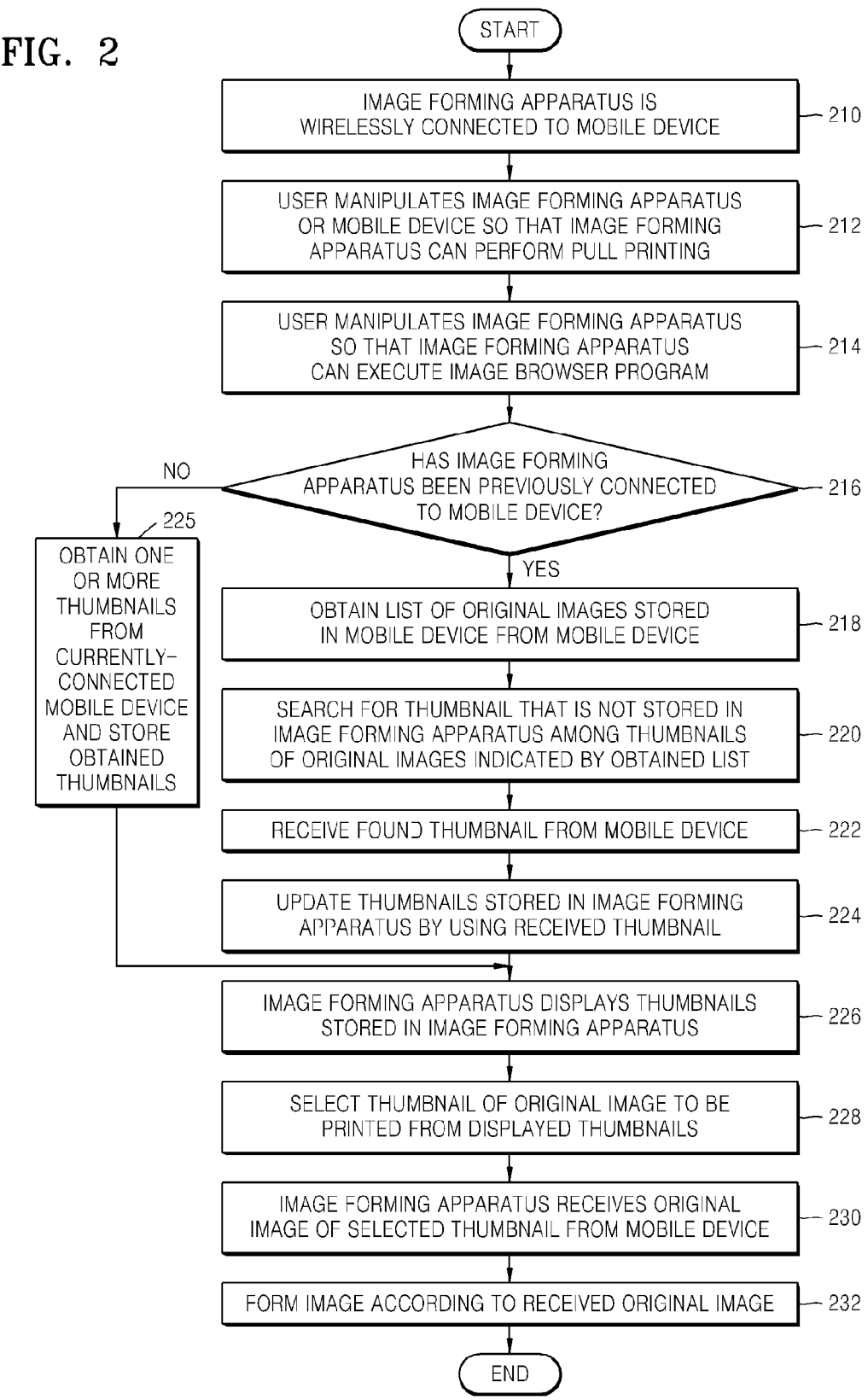

IMAGE FORMING METHOD AND APPARATUS

CROSS-REFERENCE TO RELATED APPLICATION

This application claims the benefit of Korean Application No. 2008-103202, filed Oct. 21, 2008, in the Korean Intellectual Property Office, the disclosure of which is incorporated herein by reference.

BACKGROUND OF THE INVENTION

1. Field of the Invention

Aspects of the present invention relate to an image forming apparatus such as a printer, and more particularly, an image forming apparatus which prints an image stored in a mobile device.

2. Description of the Related Art

An image forming apparatus, such as a printer, prints an original image among original images stored in a mobile device, such as a mobile phone, connected to the image forming apparatus via Bluetooth. More specifically, the mobile device stores thumbnails of original images, as well as the original images, and the image forming apparatus displays the thumbnails, which are stored in the mobile device and provided by the mobile device, on a liquid crystal display (LCD) of the image forming apparatus. A user selects one thumbnail among thumbnails displayed on the LCD of the image forming apparatus, and the image forming apparatus requests the mobile device for an original image of the selected thumbnail, receives the original image from the mobile device, and prints the original image.

When a conventional image forming apparatus receives all thumbnails from a mobile device, the conventional image forming apparatus selects one thumbnail from among the thumbnails according to the result of manipulating the image forming apparatus and prints an original image of the selected thumbnail, and then, when a user intends to print another original image using the conventional image forming apparatus, the conventional image forming apparatus receives all thumbnails of the mobile device from the mobile device. In the conventional image forming apparatus, whenever the user intends to print the original image stored in a mobile device, all of the thumbnails are provided by the mobile device. As such, in the conventional image forming apparatus, when original images stored in the mobile device are printed through a plurality of printing operations for a predetermined time interval, the plurality of printing operations cannot be rapidly completed.

SUMMARY OF THE INVENTION

Aspects of the present invention provide an image forming method through which an image forming apparatus connected to a mobile device prints original images stored in the mobile device rapidly.

Aspects of the present invention also provide an image forming apparatus which prints original images stored in a mobile device rapidly.

Aspects of the present invention also provide a computer readable recording medium having recorded thereon a program for executing the image forming method.

According to an aspect of the present invention, there is provided an image forming method performed by an image forming apparatus that is wirelessly connectable to one or more mobile devices, the method including: connecting the image forming apparatus to the one or more mobile devices; determining whether the image forming apparatus has been previously connected to the one or more mobile devices; obtaining a first photo list stored in the one or more mobile devices, if determined that the image forming apparatus has been previously connected to the one or more mobile devices; comparing the obtained first photo list with a second photo list stored in the image forming apparatus; updating the second photo list in consideration of the obtained first photo list if determined that the obtained first photo list is different from the second photo list; and displaying the updated second photo list.

The method may further include selecting at least one photo from the displayed second photo list and printing the selected at least one photo.

Each of the one or more mobile devices may include unique identification information and the image forming apparatus stores identification information of the one or more mobile devices connected to the image forming apparatus.

The determining of whether the image forming apparatus has been previously connected to the one or more mobile devices may be performed by analyzing whether the identification information of the one or more mobile devices exists in the image forming apparatus.

The method may further include: if determined that the image forming apparatus has not been previously connected to the one or more mobile devices, obtaining the first photo list from the one or more mobile devices; storing the obtained first photo list as the second photo list; displaying the stored second photo list and proceeding to the selecting of at least one photo from the displayed second photo list; and printing the selected at least one photo.

The selecting of at least one photo from the displayed second photo list and printing the selected at least one photo may include: selecting at least one photo from the displayed second photo list; and editing and printing the at least one selected photo.

The first photo list stored in the one or more mobile devices is updatable.

The first photo list may include at least one photo stored in the one or more mobile device and at least one thumbnail of the at least one photo.

The second photo list may include at least one photo stored in the image forming apparatus and at least one thumbnail of the at least one photo.

The displaying of the updated second photo list may include displaying whether each of a plurality of items constituting the updated second photo list is an item that has been previously stored in the image forming apparatus.

According to another aspect of the present invention, there is provided an image forming apparatus that is wirelessly connectable to one or more mobile devices, the apparatus including: a controller determining whether the image forming apparatus has been previously connected to the one or more mobile devices connected, obtaining a first photo list stored in the lone or more mobile devices if the image forming apparatus is connected to the one or more mobile devices, comparing the obtained first photo list with a second photo list stored in the image forming apparatus if determined that the image forming apparatus has been previously connected to the one or more mobile devices, and updating the second photo list in consideration of the obtained first photo list if determined that the obtained first photo list is different from the second photo list; and a user interface unit displaying the updated second photo list and receiving at least one photo from the displayed second photo list.

The apparatus may further include an image forming unit printing the selected at least one photo.

Each of the one or more mobile devices may include unique identification information and the image forming apparatus may store identification information of the one or more mobile devices connected to the image forming apparatus.

The controller may analyze whether the identification information of the one or more mobile devices connected exists in the image forming apparatus and may determine whether the image forming apparatus has been previously connected to the connected one or more mobile devices.

The controller obtains the first photo list from the connected one or more mobile devices if determined that the image forming apparatus has not been previously connected to the one or more mobile devices, and further comprising: a storage unit storing the obtained first photo list as the second photo list, wherein the user interface unit displays the stored second photo list on the user interface.

The image forming unit may edit and print the selected photo.

The first photo list stored in the one or more mobile devices is updatable.

The first photo list may include at least one photo stored in the one or more mobile devices and at least one thumbnail of the at least one photo.

The second photo list may include at least one photo stored in the image forming apparatus and at least one thumbnail of the at least one photo.

The user interface unit may display whether each of a plurality of items constituting the updated second photo list is an item that has been previously stored in the image forming apparatus.

According to another aspect of the present invention, there is provided a computer readable recording medium having recorded thereon a program for executing the method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a flowchart illustrating an image forming method according to an embodiment of the present invention.

DETAILED DESCRIPTION OF THE EMBODIMENTS

Figure 1:
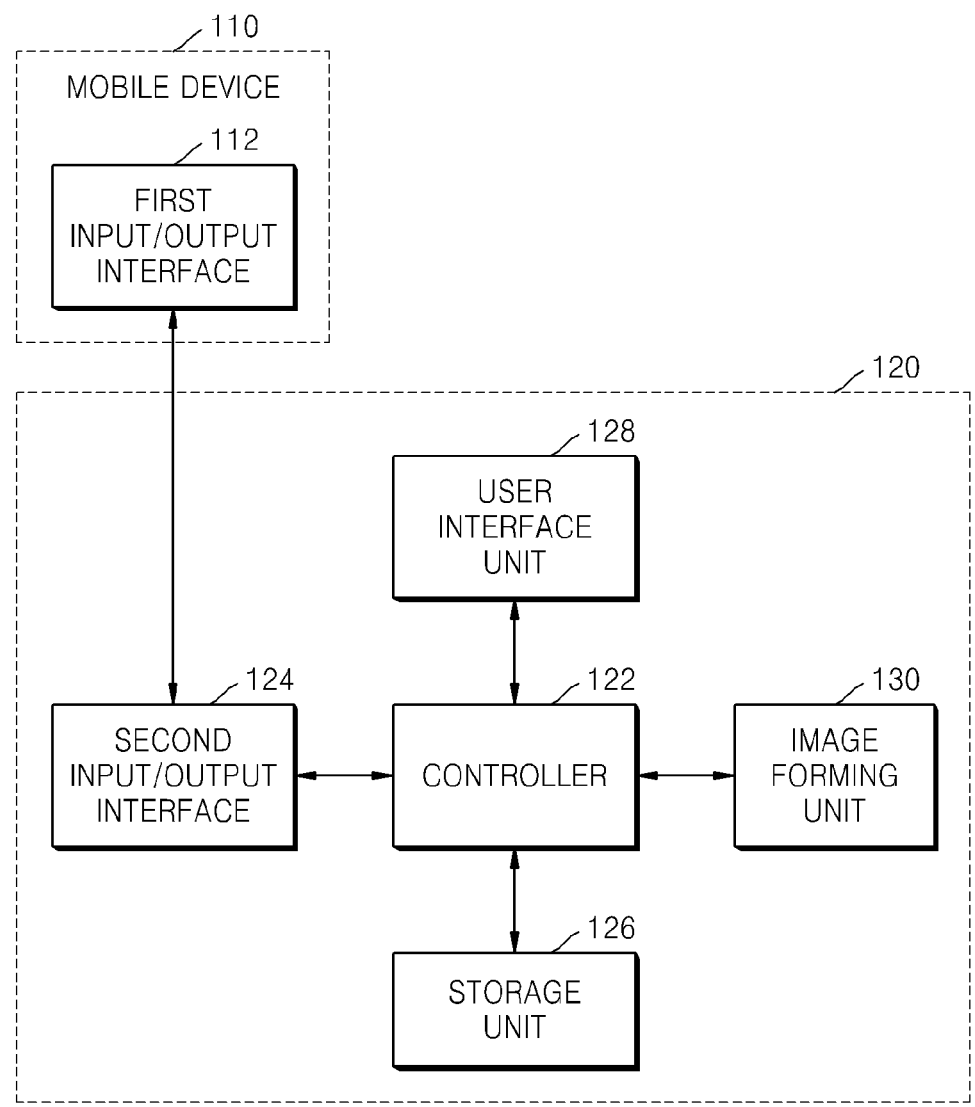
FIG. 1 is a block diagram of an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image forming apparatus according to an embodiment of the present invention. A mobile device 110 and an image forming apparatus 120 are illustrated in FIG. 1. Here, the mobile device 110 includes a first input/output interface 112, and the image forming apparatus 120 includes a controller 122, a second input/output interface 124, a storage unit 126, a user interface unit 128, and an image forming unit 130.

The mobile device 110 may be a mobile phone, a personal digital assistant (PDA), a digital camera, a digital video camera, a laptop computer, or other such mobile or wireless devices. The image forming apparatus 120 may be a printer and a multi function peripheral (MFP) having a printing function.

The mobile device 110 searches for the image forming apparatus 120, which communicates with the mobile device 110, using file transfer protocol (FTP) according to the result of manipulating the mobile device 110, and displays the found image forming apparatus 120 to notify a user of the image forming apparatus 120.

After that, the user manipulates the mobile device 110 or the found image forming apparatus 120 so that the mobile device 110 and the found image forming apparatus 120 are connected wirelessly to each other and communicate with each other using FTP. Hereinafter, for convenience of explanation, it is assumed that the mobile device 110 and the image forming apparatus 120 are connected wirelessly to each other and communicate with each other using Bluetooth, however, aspects of the present invention are not limited thereto.

After that, the user manipulates the mobile device 110 or the found image forming apparatus 120 so that the image forming apparatus 120 can perform pull printing. Here, pull printing is a printing method through which, when the image forming apparatus 120 prints original images stored in the mobile device 100, the image forming apparatus 120 requests the mobile device 110 for provision of the original images, receives the original images, and prints them. In the present specification, a photo is a type of original image.

After that, the user manipulates the image forming apparatus 120 so as to observe one or more original images stored in the mobile device 110 on an image browser program executed in the image forming apparatus 120. In this regard, the controller 122 of the image forming apparatus 120 obtains a first photo list stored in the mobile device 110 from the mobile device 110. In the present specification, a photo is an original image, and the first photo list is a list including at least one or more photos stored in the mobile device 110 and a thumbnail of each of the one or more photos. The first photo list may be updated according to a second photo list that will be described as follows. The second photo list may be updated according to the first photo list. Specifically, the controller 122 requests the mobile device 110 for provision of the first photo list. As such, the mobile device 110 outputs the first photo list through the first input/output interface 112, and the image forming apparatus 120 receives the first photo list, which is input from the mobile device 110, through the second input/output interface 124. After that, the controller 122 of the image forming apparatus 120 determines whether the image forming apparatus 120 has been previously connected to the currently-connected mobile device 110. To facilitate the determination, unique identification information is allocated to each of one or more mobile devices 110 that is connectable to the image forming apparatus 120. The currently-connected mobile device 110 has its own unique identification information. The image forming apparatus 120 may accumulatively have identification information of the one or more mobile device 110 that have been connected to the image forming apparatus 120. As such, the image forming apparatus 120 analyzes whether the identification information of the currently-connected mobile device 110 is stored in the image forming apparatus 120, thereby determining whether the currently-connected mobile device 110 has been previously connected to the image forming apparatus 120.

In this case, when it is determined that the currently-connected mobile device 110 has been previously connected to the image forming apparatus 120, the controller 122 compares the first photo list obtained from the currently-connected mobile device 110 with the second photo list stored in the image forming apparatus 120 that corresponds to the currently-connected mobile device 110. In the present specification, the second photo list is a list including at least one or more photos stored in the storage unit 126 of the image forming apparatus 120 and a thumbnail of each of the one or more photos. After that, when the obtained first photo list is determined to be different from the second photo list as the result of comparing the first photo list with the second photo list, the controller 122 updates the second photo list stored in the storage unit 126 of the image forming apparatus 120 and which corresponds to the currently-connected mobile device 110. The controller 122 compares the second photo list stored in the storage unit 126 of the image forming apparatus 120 and which corresponds to the currently-connected mobile device 110 with the first photo list stored in the mobile device 110 and updates the second photo list according to the result of comparison. In other words, the controller 122 updates the second photo list stored in the storage unit 126 and that corresponds to the currently-connected mobile device 110 so that the second photo list stored in the storage unit 126 and that corresponds to the currently-connected mobile device 110 coincides with the first photo list that is currently stored in the mobile device 110. For example, the controller 122 may obtain a thumbnail that does not exist in the storage unit 126, among the first photo list that is currently stored in the mobile device 110, from the mobile device 110 and may update one or more thumbnails stored in the storage unit 126 and that correspond to the currently-connected mobile device 110, by using the obtained thumbnail. In the present exemplary embodiment, the storage unit 126 stores the first photo list of the mobile device 110 as the second photo list according to one or more mobile devices 110 that is connectable to the image forming apparatus 120. In other words, the second photo list, and the first photo list exist on one or more mobile devices 110. The second photo list of the mobile device 110 that has not been previously connected to the image forming apparatus 120 may not be stored in the image forming apparatus 120.

On the other hand, when it is determined that the currently-connected mobile device 110 is first (newly) connected to the image forming apparatus 120, the storage unit 126 stores the first photo list that is obtained from the currently-connected mobile device 110 as the second photo list of the currently-connected mobile device 110.

The user interface unit 128 operates according to the control of the controller 122. Specifically, the user interface unit 128 displays the second photo list stored in the storage unit 126 and that corresponds to the currently-connected mobile device 110 on a liquid crystal display (LCD). The user interface unit 128 may display whether each of the items constituting the second photo list is an item that has been previously stored in the storage unit 126 of the image forming apparatus 120 and corresponds to the currently-connected mobile device 110, together with the second photo list. For example, the user interface unit 128 darkly displays an item that has been previously stored in the storage unit 126 and brightly displays an item that represents a photo and thumbnail that have not been previously stored in the storage unit 126 and have been recently supplied from the mobile device 110y.

According to an embodiment of the present invention, the first photo list is a text listing of one or more photos stored in the mobile device 110, and the second photo list is a text listing of one or more photos stored in the image forming apparatus 120. According to the current embodiment, when the mobile device 110 and the image forming apparatus 120 are connected to each other, the controller 122 determines whether the image forming apparatus 120 has been previously connected to the mobile device 110. When it is determined that the image forming apparatus 120 has been previously connected to the mobile device 110, the controller 122 compares the first photo list stored in the mobile device 110 with the second photo list stored in the storage unit 126 of the image forming apparatus 120. When the first photo list stored in the mobile device 110 is determined to be different from the second photo list stored in the storage unit 126 of the image forming apparatus 120 as the result of comparing them, the controller 122 takes a thumbnail, from the mobile device 110, corresponding to an item that does not exist in the second photo list from among items of the first photo list. In this case, the controller 122 may take one or more thumbnails from the mobile device 110 to add to the one or more thumbnails that have been previously stored in the storage unit 126, store them in the storage unit 126, and update the one or more thumbnails stored in the storage unit 126 and that correspond to the currently-connected mobile device 110. After that, the user interface unit 128 is controlled by the controller 122 to display the updated one or more thumbnails that are stored in the storage unit 126. The user who observes the displayed thumbnails manipulates the user interface unit 128 and selects one or more thumbnails among the displayed thumbnails. To this end, the user interface unit 128 has a function as a key input device, such as a keypad, a button or a touch pad. Meanwhile, the controller 122 requests the mobile device 110 for a photo (i.e., an original image) of each of the selected thumbnails and obtains the photo (i.e., the original image) from the mobile device 110. The image forming unit 130 prints the obtained photo (i.e., the original image).

According to another embodiment of the present invention, the first photo list is a set of one or more photos stored in the mobile device 110 and thumbnails of the one or more photos, and the second photo list is a set of one or more photos stored in the image forming apparatus 120 and thumbnails of the one or more photos. According to the current embodiment, when the mobile device 110 and the image forming apparatus 120 are connected to each other, the controller 122 determines whether the image forming apparatus 120 has been previously connected to the mobile device 110. When it is determined that the image forming apparatus 120 has been previously connected to the mobile device 110, the controller 122 compares the first photo list stored in the mobile device 110 with the second photo list stored in the storage unit 126 of the image forming apparatus 120. When the first photo list stored in the mobile device 110 is different from the second photo list stored in the storage unit 126 of the image forming apparatus 120, the controller 122 takes from the mobile device 110 photos and thumbnails which correspond to items that are not in the second photo list from among items of the first photo list. After that, the controller 122 adds the taken photos and thumbnails to the second photo list that is stored in the storage unit 126 to correspond to the currently-connected mobile device 110, thereby updating the second photo list. After that, the user interface unit 128 displays one or more photos included in the second photo list according to the control of the controller 122. The user manipulates the user interface unit 128 and selects one or more photos from the displayed one or more photos. Then, the image forming unit 130 prints the selected one or more photos.

FIG. 2 is a flowchart illustrating an image forming method according to an embodiment of the present invention. The image forming method according to the current embodiment may include operations 210 through 232 that allow original images stored in the mobile device 110 to be rapidly printed by the image forming apparatus 120 connected to the mobile device 110, as described with reference to FIG. 1 below.

When the mobile device 110 is wirelessly connected to the image forming apparatus 120, in operation 210, the user manipulates the mobile device 110 or the image forming apparatus 120 so that the image forming apparatus 120 can perform pull printing, in operation 212.

After operation 212, the image forming apparatus 120 starts execution of an image browser program according to the result of manipulating the image forming apparatus 120, in operation 214.

After operation 214, the image forming apparatus 120 determines whether the currently-connected mobile device 110 has been previously connected to the image forming apparatus 120, in operation 216. If determined in operation 216 that the currently-connected mobile device 110 has been previously connected to the image forming apparatus 120, the image forming apparatus 120 obtains a list of original images stored in the mobile device 110, i.e., the first photo list, from the mobile device 110, in operation 218.

In operation 220, the image forming apparatus 120 searches for a thumbnail that is not stored in the image forming apparatus 120, among thumbnails of the original images of the first photo list obtained in operation 218.

In operation 222, the image forming apparatus 120 requests the mobile device 110 to provide the thumbnail found in operation 220 and receives the thumbnail found in operation 220 from the mobile device 110. In operation 224, the image forming apparatus 120 updates the thumbnails stored in the image forming apparatus 120 with the received thumbnail. In other words, in operation 224, the image forming apparatus 120 stores the thumbnail received in operation 222 as an additional thumbnail of the thumbnails of the mobile device 110.

Otherwise, if determined in operation 216 that the currently-connected mobile device 110 has not been previously connected to the image forming apparatus 120, the image forming apparatus 120 obtains one or more thumbnails from the currently-connected mobile device 110, stores the obtained thumbnails, and displays the stored thumbnails, in operation 225.

After operation 224 or 225, the image forming apparatus 120 displays the thumbnails that are stored in the image forming apparatus 120 and corresponds to the currently-connected mobile device 110, in operation 226. After operation 226, the image forming apparatus 120 selects a thumbnail of an original image to be printed by the image forming apparatus 120 from the thumbnails displayed in operation 226 according to the result of manipulating the image forming apparatus 120, in operation 228.

After operation 228, the image forming apparatus 120 requests the mobile device 110 to provide an original image of the thumbnail selected in operation 228 and in operation 230, the image forming apparatus 120 receives the original image of the thumbnail selected in operation 228 from the mobile device 110.

In operation 232, the image forming apparatus 120 forms an image according to the original image provided in operation 230. In other words, the image forming apparatus 120 does not edit the original image provided in operation 230 and prints the non-edited original image, or edits the original image provided in operation 230 according to the result of manipulating the image forming apparatus 120 and then prints the edited original image.

Aspects of the invention can also be embodied as computer readable code on a computer readable recording medium. The computer readable recording medium is any data storage device that can store data which is thereafter readable by a computer system. Examples of the computer readable recording medium include read-only memory (ROM), random-access memory (RAM), CD-ROMs, magnetic tapes, floppy disks, and optical data storage devices.

In the image forming method and apparatus according to aspects of the present invention, the image forming apparatus 120, in order to print an original image stored in a mobile device that is newly connected to the image forming, receives thumbnails of original images stored in the mobile device 110, selects a thumbnail of the original image from the thumbnails according to the result of manipulating the image forming apparatus 120, receives the original image of the selected thumbnail from the mobile device, and prints the selected thumbnail and then when a user intends to print the original image or another original image stored in the mobile device. The image forming apparatus 120 receives only thumbnails that have not been received, among the thumbnails stored in the mobile device, from the mobile device 110, deletes thumbnails that are not currently stored in the mobile device 110, among the thumbnails stored in the image forming apparatus 120, updates the thumbnails stored in the image forming apparatus 120 and then, selects a thumbnail from the updated thumbnails according to the result of manipulating the image forming apparatus 120, receives an original image of the selected thumbnail from the mobile device 110 and prints the original image of the selected thumbnail.

According to aspects of the present invention, the image forming apparatus 120 does not need to receive thumbnails from the mobile device 110 repeatedly whenever the image forming apparatus prints original images stored in the mobile device. Thus, when the image forming apparatus 120 performs a plurality of printing operations of the original images stored in the mobile device 110 for a predetermined time interval, the image forming apparatus can complete the plurality of printing operations very rapidly and does not need to communicate with the mobile device using Bluetooth.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming method performed by an image forming apparatus that is wirelessly connectable to one or more mobile devices, the method comprising:

connecting the image forming apparatus to the one or more mobile devices;

the image forming apparatus determines whether one or more mobile devices has been previously connected to the image forming apparatus;

obtaining a first photo list stored in the one or more mobile devices, if determined that the image forming apparatus has been previously connected to the one or more mobile devices;

comparing the obtained first photo list with a second photo list stored in the image forming apparatus;

updating the second photo list in consideration of the obtained first photo list if determined that the obtained first photo list is different from the second photo list; and displaying the updated second photo list.

2. The method of claim 1, further comprising selecting at least one photo from the displayed second photo list and printing the selected at least one photo.

3. The method of claim 1, wherein each of the one or more mobile devices comprises unique identification information and the image forming apparatus stores identification information of the one or more mobile devices connected to the image forming apparatus.

4. The method of claim 3, wherein the determining of whether the image forming apparatus has been previously connected to the one or more mobile devices is performed by analyzing whether the identification information of the one or more mobile devices exists in the image forming apparatus.

5. The method of claim 2, further comprising:
wherein, if determined that the image forming apparatus has not been previously connected to the one or more mobile devices,
obtaining the first photo list from the one or more mobile devices;
storing the obtained first photo list as the second photo list;
displaying the stored second photo list and proceeding to the selecting of at least one photo from the displayed second photo list; and
printing the selected at least one photo.

6. The method of claim 2, wherein the selecting of at least one photo from the displayed second photo list and printing the selected at least one photo comprises: selecting at least one photo from the displayed second photo list; and editing and printing the at least one selected photo.

7. The method of claim 1, wherein the first photo list stored in the one or more mobile devices is updatable.

8. The method of claim 1, wherein the first photo list comprises at least one photo stored in the one or more mobile devices and at least one thumbnail of the at least one photo.

9. The method of claim 1, wherein the second photo list comprises at least one photo stored in the image forming apparatus and at least one thumbnail of the at least one photo.

10. The method of claim 1, wherein the displaying of the updated second photo list comprises displaying whether each of a plurality of items constituting the updated second photo list is an item that has been previously stored in the image forming apparatus.

11. An image forming apparatus that is wirelessly connectable to one or more mobile devices, the apparatus comprising:
a controller of the image forming apparatus determines whether one or more mobile devices has been previously connected to the image forming apparatus, obtaining a first photo list stored in the one or more mobile device if determined that the image forming apparatus has been previously connected to the one or more mobile devices, comparing the obtained first photo list with a second photo list stored in the image forming apparatus, and updating the second photo list in consideration of the obtained first photo list if determined that the obtained first photo list is different from the second photo list; and
a user interface unit displaying the updated second photo list and receiving at least one photo from the displayed second photo list.

12. The apparatus of claim 11, further comprising an image forming unit printing the selected at least one photo.

13. The apparatus of claim 11, wherein each of the one or more mobile devices comprises unique identification information and the image forming apparatus stores identification information of the one or more mobile devices connected to the image forming apparatus.

14. The apparatus of claim 13, wherein the controller analyzes whether the identification information of the one or more mobile devices connected exists in the image forming apparatus and determines whether the image forming apparatus has been preciously connected to the connected one or more mobile devices.

15. The apparatus of claim 11, wherein, the controller obtains the first photo list from the connected one or more mobile devices if determined that the image forming apparatus has not been previously connected to the one or more mobile devices, and further comprising: a storage unit storing the obtained first photo list as the second photo list, wherein the user interface unit displays the stored second photo list on the user interface.

16. The apparatus of claim 12, wherein the image forming unit edits and prints the selected photo.

17. The apparatus of claim 11, wherein the first photo list stored in the one or more mobile devices is updatable.

18. The of claim 11, wherein the first photo list comprises at least one photo stored in the one or more mobile devices and at least one thumbnail of the at least one photo.

19. The apparatus of claim 11, wherein the second photo list comprises at least one photo stored in the image forming apparatus and at least one thumbnail of the at least one photo.

20. The apparatus of claim 11, wherein the user interface unit displays whether each of a plurality of items constituting the updated second photo list is an item that has been previously stored in the image forming apparatus.

21. An image forming apparatus, comprising:
a storage unit having an apparatus photo list;
a controller of the image forming apparatus determines whether one or more mobile devices has been previously connected to the image forming apparatus and automatically updating the apparatus photo list according to one or more mobile devices having a mobile photo list;
an input and/or output interface receiving data from the one or more mobile devices to store on the apparatus photo list;
a user interface to display the apparatus photo list as thumbnail images; and
an image forming unit printing at least one selected photo displayed on the user interface,
wherein, the controller compares the apparatus photo list and the mobile photo list to determine if the mobile photo list is different from the apparatus photo list.

22. A method of pull printing performed by an image forming apparatus, comprising:
storing one or more apparatus photo lists corresponding to one or more mobile devices in a storage unit;
connecting to the one or more mobile devices through an apparatus interface;
the image forming apparatus determines whether one or more mobile devices has been previously connected to the image forming apparatus;
obtaining mobile photo data from the connected one or more mobile devices; and
storing the obtained mobile photo data as apparatus photo data corresponding to the connected one or more mobile devices.

23. The method of claim 22, the obtaining the photo data comprises:

obtaining a mobile photo list stored in the one or more mobile device, if determined that the image forming apparatus has been previously connected to the one or more mobile devices;

comparing the obtained mobile photo list with an apparatus photo list stored in the image forming apparatus;

updating the apparatus photo list in consideration of the obtained mobile photo list if determined that the obtained mobile photo list is different from the apparatus photo list corresponding to the one or more mobile device.

* * * * *

UNITED STATES PATENT AND TRADEMARK OFFICE
CERTIFICATE OF CORRECTION

PATENT NO.         : 8,582,146 B2                                Page 1 of 1
APPLICATION NO.    : 12/431139
DATED              : November 12, 2013
INVENTOR(S)        : Hwang-hyeon Gha It is certified that error appears in the above-identified patent and that said Letters Patent is hereby corrected as shown below:

In the Claims

In Column 10, Line 23, In Claim 18, delete "The of" and insert -- The apparatus of --, therefor.

Signed and Sealed this
Twenty-fifth Day of March, 2014

Michelle K. Lee
*Deputy Director of the United States Patent and Trademark Office*